(12) United States Patent
Tsai

(10) Patent No.: US 7,055,659 B2
(45) Date of Patent: Jun. 6, 2006

(54) BIKE BRAKE SHOE MOLDING STRUCTURE

(75) Inventor: Szu-Fang Tsai, Walnut Creek, CA (US)

(73) Assignee: Tektro Technology Corporation, Chang-Hua Hsien (TW)

( * ) Notice: Subject to any disclaimer, the term of this patent is extended or adjusted under 35 U.S.C. 154(b) by 0 days.

(21) Appl. No.: 10/834,929

(22) Filed: Apr. 30, 2004

(65) Prior Publication Data
US 2005/0241888 A1 Nov. 3, 2005

(51) Int. Cl.
*F16D 69/00* (2006.01)

(52) U.S. Cl. ............... 188/250 B; 188/250 G; 188/2 D

(58) Field of Classification Search ............ 188/24.19, 188/24.21, 2 D, 251 R, 258, 250 H, 250 F, 188/250 G, 250 B, 73.1
See application file for complete search history.

(56) References Cited

U.S. PATENT DOCUMENTS

| 4,611,692 A | * | 9/1986 | Everett | 188/73.1 |
| 4,901,823 A | * | 2/1990 | Chang | 188/73.1 |
| 6,068,090 A | * | 5/2000 | Chen et al. | 188/24.22 |
| 6,125,973 A | * | 10/2000 | Irvine | 188/24.22 |

FOREIGN PATENT DOCUMENTS

| DE | 3900087 A1 | * | 2/1990 |
| EP | 600154 A1 | * | 6/1994 |

\* cited by examiner

*Primary Examiner*—Xuan Lan Nguyen
(74) *Attorney, Agent, or Firm*—Leong C. Lei

(57) ABSTRACT

An improved molding structure of a bike brake shoe including a pre-assembly of metal base comprised of a disk, a cover and an adjustment base before being injection molded into a brake shoe by injection is characterized by that an opening of the disk forms a separation chamber when closed up with the cover to prevent seepage of glue solution in the course of molding and to allow the adjustment base in the chamber to have its rod merely slacken and protruding out of the bottom of the disk for the brake shoe to permit easy adjustment by sliding, and thus better braking effect.

1 Claim, 3 Drawing Sheets

BIKE BRAKE SHOE MOLDING STRUCTURE

BACKGROUND OF THE INVENTION (a) Technical Field of the Invention

The present invention is related to a bike brake shoe molding structure, and more particularly, to one wrapped with a metal base.

(b) Description of the Prior Art

In the prior art, a bike brake shoe is injected in a molding structure containing a base wrapped with rubber material. Referring to FIG. 1 of the accompanying drawings, a brake shoe 1, a disk 11 of a metal base 10 is integrated by pivoting to a rod 12 before being placed into a die to be injection molded with glue solution for a bike brake shoe provided with a fixed rod. As illustrated in FIG. 2, a brake shoe 2 is first having a metal nut 22 fixed on the inner side of a metal disk 21 before being placed die to be injection molded with glue solution for a bike brake shoe provided with a fixed rod and a threaded hole 221 reserved for connecting to a threaded rod. Now referring to FIG. 3, a brake shoe 3 provided with auto inching function is characterized by that a metal adjustment base 33 is separately placed in a reserved hole 32, and is the hole 32 is then retained by a rubber filling block 34 so that a local displacement by rotation is achieved when the adjustment base 33 is released by loosening a bolt inserted through a screw hole 331 on the adjustment base 33. Accordingly, a braking surface 35 can be easily inched to stay flushed with the edge of the rim of the bike to have the adjustment base screwed in position to achieve the optimal braking effect. However, a hole 32 must be reserved for the brake shoe 3 to accommodate the adjustment base 33 to rule out the possibility of a simple production. Furthermore, the mounting of the filling block 34 only makes the assembly more complicate, and it may cause safety concerns since the filling block 34 may fall off due to the abrasion and vibration after a given time.

Among all those three types of braking shoes described above, the third one, i.e. the braking shoe 3, is the most practical and popular since it allows easy inching adjustment to stay flushed with the edge of the rim of the wheel. The present invention is related to an improved structure of the braking shoe 3.

SUMMARY OF THE INVENTION

The primary purpose of the present invention is to provide an improved molding structure of a braking shoe, wherein, the cover and the opening of the disk are disposed in symmetry, and a pair of locking bits with matching locking holes are provided also in symmetry to make sure that both are secured and later molded to provide better reinforcement results. To achieve the purpose, the present invention includes a pre-assembly of metal base comprised of a disk a cover and an adjustment base before being injection molded into a brake shoe by injection, and is characterized by that an opening of the disk forms a separation chamber when closed up with the cover to prevent seepage of glue solution in the course of molding and to allow the adjustment base in the chamber to have its rod merely slacken and protruding out of the bottom of the disk for the brake shoe to permit easy adjustment by sliding, and thus better braking effect.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
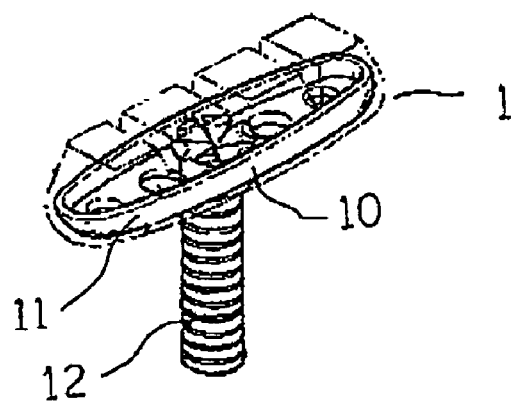
FIG. 1 is a schematic view showing a braking shoe of the prior art.
Figure 2:
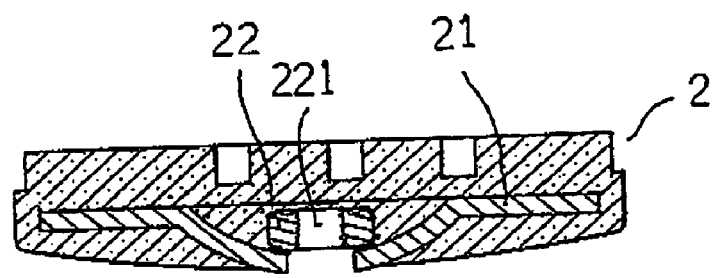
FIG. 2 is a schematic view showing another braking shoe of the prior art.
Figure 3:
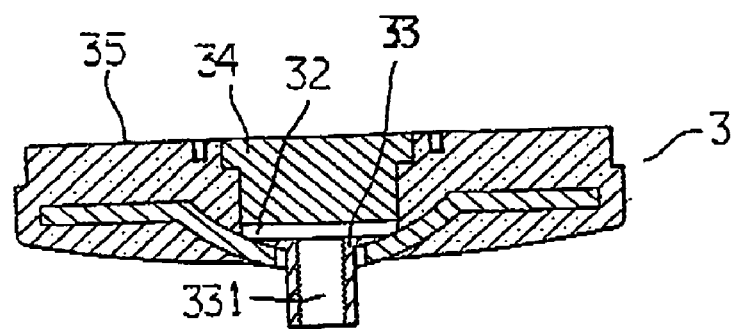
FIG. 3 is a schematic view showing another braking shoe yet of the prior art.
Figure 4:
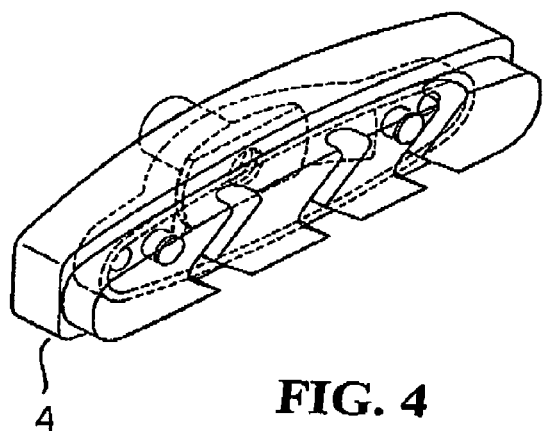
FIG. 4 is a perspective view showing an assembly of the present invention.
Figure 5:
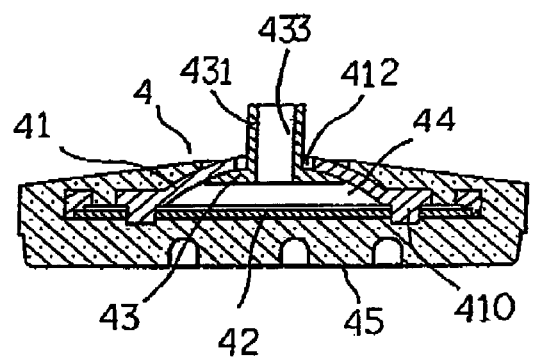
FIG. 5 is a sectional view of the assembly of the present invention.
Figure 6:
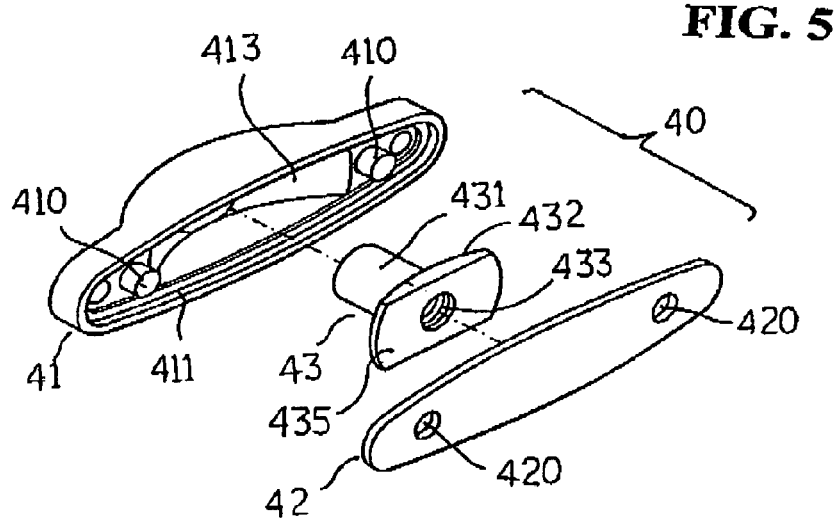
FIG. 6 is an exploded view of the assembly of the present invention.
Figure 7:
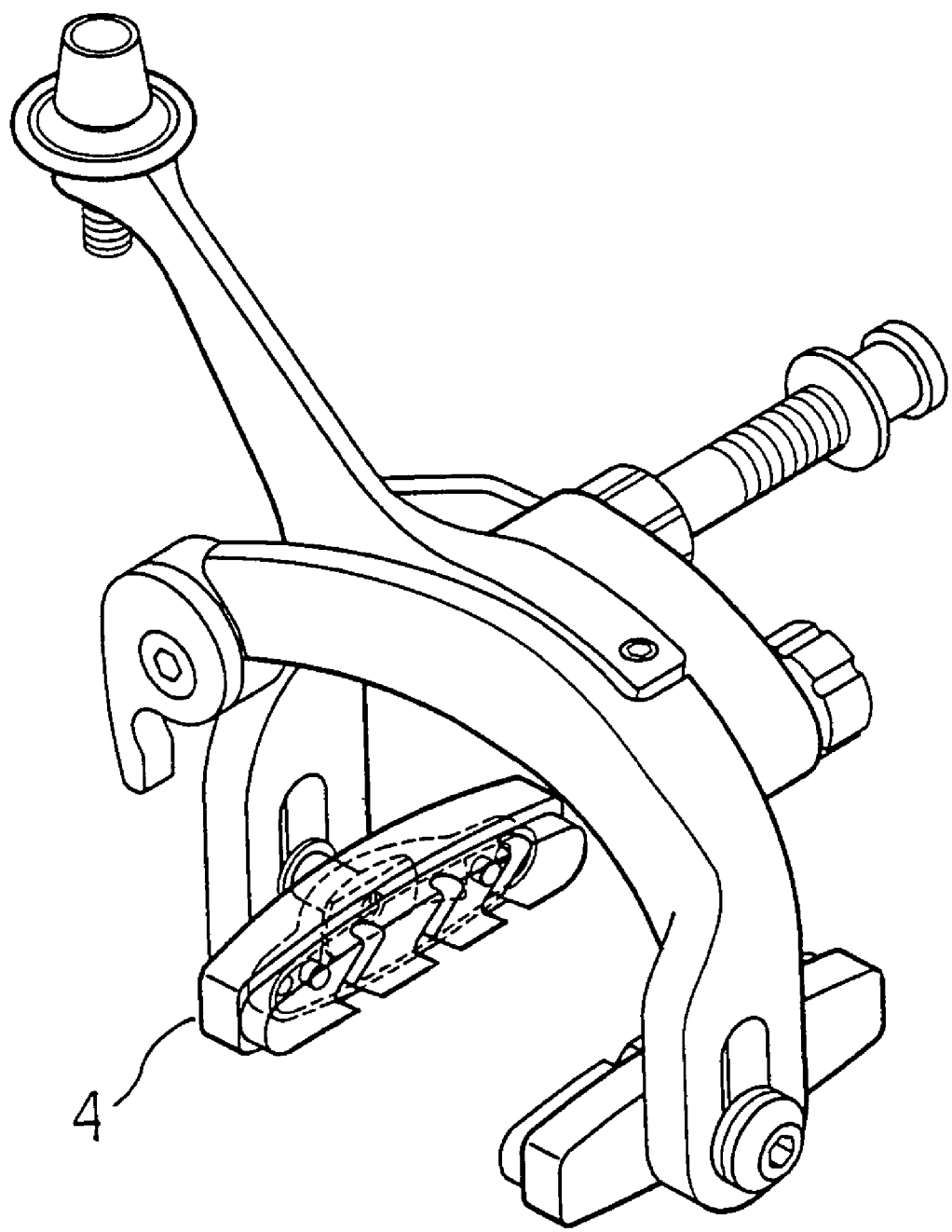
FIG. 7 is a schematic view showing the present invention is in action.

Referring to FIGS. 4, 5, and 6, the present invention relates to an improved molding structure of a braking shoe 4 including a pre-assembled metal base comprised of a disk 41, a cover 42 and an adjustment base 43 to be molded by injection into a brake shoe. An opening 411 of the disk 41 is sealed with the cover 42 to define a separation chamber 44 to prevent seepage of glue solution in the course of molding. The adjustment base 43 has a rod 431 and a flange 435 at an end of the rod 431. The rod 431 has a center screw hole 433. The flange 435 has a flat bottom and a convex top. The adjustment base 43 placed in the separation chamber 44 has a rod 431 merely slacken and protruding out of an opening 412 of the disk 41. An convex surface 432 of the adjustment base 43 slides on a concaved surface 413 at the bottom of the disk 41 to permit easier displacement by sliding for the braking shoe 4 to provide better braking effect.

Furthermore, the cover 42 and the opening 411 of the disk are made in symmetric forms respectively provided with a pair of locking bits 410 and their matching locking holes 420 to better secure the disk 41 and the cover 42 to each other.

Accordingly, a screw hole 433 on the rod 431 of the adjustment base 43 is engaged with a bolt for the disk shoe to be secured by pivoting to the brake. That is, upon loosening the bolt, the arc surface of the adjustment base 43 is allowed to slide on the bottom arc surface 43 of the disk 41 to fast guide the adjustment in position for a retaining surface 45 to stay more flushed on the edge of the edge of the rim, thus to achieve better braking effect.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A molding structure of a bike brake shoe comprising:

a cover having two locking holes;

a disk having a top provided with a hole and a bottom provided with an opening sealed with said cover to define a separation chamber, said bottom being formed with a concave surface, said disk having two locking bits adapted to engage with said locking holes of said cover;

said cover stopping seepage of glue solution into said separation chamber in the course of molding; and an adjustment base having a rod and a flange at an end of said rod, said rod having a center screw hole, said flange having a flat bottom and a convex top, said rod being slacken and protruding out of said hole of said disk with said convex top in contact with said concave surface of said disk thereby allowing displacement of said disk to enable a retaining surface of said bike brake shoe to stay flushed on an edge of a rim.

* * * * *